United States Patent

Douglas

(10) Patent No.: US 7,162,550 B2
(45) Date of Patent: Jan. 9, 2007

(54) METHOD, SYSTEM, AND PROGRAM FOR MANAGING REQUESTS TO AN INPUT/OUTPUT DEVICE

(75) Inventor: Chet R. Douglas, Bisbee, AZ (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 10/624,408

(22) Filed: Jul. 21, 2003

(65) Prior Publication Data

US 2005/0021879 A1    Jan. 27, 2005

(51) Int. Cl.
*G06F 13/00* (2006.01)
(52) U.S. Cl. .............. 710/35; 710/5; 710/29; 710/36; 710/39; 709/233
(58) Field of Classification Search .............. 710/5, 710/15, 17, 18, 29, 35, 36, 39, 52, 53; 709/232–234
See application file for complete search history.

(56) References Cited

U.S. PATENT DOCUMENTS

| | | | | |
|---|---|---|---|---|
| 5,278,984 A | * | 1/1994 | Batchelor | 719/314 |
| 5,522,054 A | * | 5/1996 | Gunlock et al. | 711/112 |
| 5,590,304 A | * | 12/1996 | Adkisson | 711/100 |
| 5,948,081 A | * | 9/1999 | Foster | 710/40 |
| 6,292,856 B1 | * | 9/2001 | Marcotte | 710/39 |
| 6,877,049 B1 | * | 4/2005 | Myers | 710/56 |
| 2004/0143687 A1 | * | 7/2004 | Cox | 710/5 |

\* cited by examiner

*Primary Examiner*—Kim Huynh
*Assistant Examiner*—Eron Sorrell
(74) *Attorney, Agent, or Firm*—David W. Victor; Konrad Raynes & Victor LLP

(57) ABSTRACT

Provided are a method, system, and program for managing requests to an Input/Output (I/O) device. The I/O requests directed to the I/O device are queued and a determination is made as to whether a number of queued I/O requests exceeds a threshold. If the number of queued I/O requests exceeds the threshold, then a coalesce limit is calculated. A number of queued I/O requests not exceeding the calculated coalesce limit are coalesced into a coalesced /O request and the coalesced I/O request is transmitted.

25 Claims, 5 Drawing Sheets

I/O Request

| Number of Requests | I/O Request Location | Number of Requests to Hardware > Queue Depth Trigger | Coalesce Limit |
|---|---|---|---|
| 447<br>384 | Device Driver I/O Queue | Yes | 5 |
| 383<br>320 | | | 4 |
| 310<br>256 | | | 3 |
| 255<br>192 | | | 2 |
| 191<br>128 | | | 1 |
| 127<br>64<br>63<br>0 | Controller I/O Queue | No | |

QueueDepthTrigger = 127
Interval = 64

FIG. 5

METHOD, SYSTEM, AND PROGRAM FOR MANAGING REQUESTS TO AN INPUT/OUTPUT DEVICE

BACKGROUND OF THE INVENTION

1. Field of the Invention

The present invention relates to a method, system, and program for managing requests to an Input/Output (I/O) device.

2. Description of the Related Art

A computer operating system or application executing in the computer communicates Input/Output (I/O) requests to a device driver program executing in the computer. The device driver interfaces with a storage controller that manages I/O requests for a storage device. For instance, the storage controller may comprise a hardware component internal or external to the storage device. For instance, the storage controller may comprise hardware implemented in a card attached to a bus of the computer to transfer I/O requests to a storage device, such as a Small Computer System Interface (SCSI) storage controller implemented on a Peripheral Component Interconnect (PCI) card in the computer. Still further, the storage controller may be implemented in hardware on the computer motherboard. The storage controller may implement any type of storage protocol known in the art, such as SCSI, Integrated Drive Electronics (IDE), Fibre Channel (FC), Serial Attached SCSI (SAS), Advanced Technology Attachment (ATA), Serial ATA (SATA), etc. The disk drives managed by the storage controller may be organized as a Redundant Array of Independent Disks (RAID), Just a Bunch of Disks (JBOD), etc.

The device driver software and storage controller hardware may each maintain a queue of I/O requests received from an application executing in the computer. The device driver queue would initially receive I/O requests and then transfer those requests to the storage controller hardware where the requests are queued until executed by the storage controller hardware. In current implementations, to maintain the flow of I/O requests to the hardware queue, the device driver would periodically detect if requests are being received in a sequential mode, which means that a series of requests are directed to sequential logical block addresses (LBAs). If the requests are being received in sequential mode, then the device driver may coalesce a fixed number of sequential I/O requests into a single coalesced I/O request that is sent to the device driver hardware to bundle multiple small sequential requests into fewer, larger sequential requests to maximize the bandwidth.

BRIEF DESCRIPTION OF THE DRAWINGS

Referring now to the drawings in which like reference numbers represent corresponding parts throughout:

FIG. 5 illustrates a relationship of the number of I/O requests at a device driver and hardware queues and a coalesce limit of a number of I/O requests to coalesce in accordance with embodiments of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
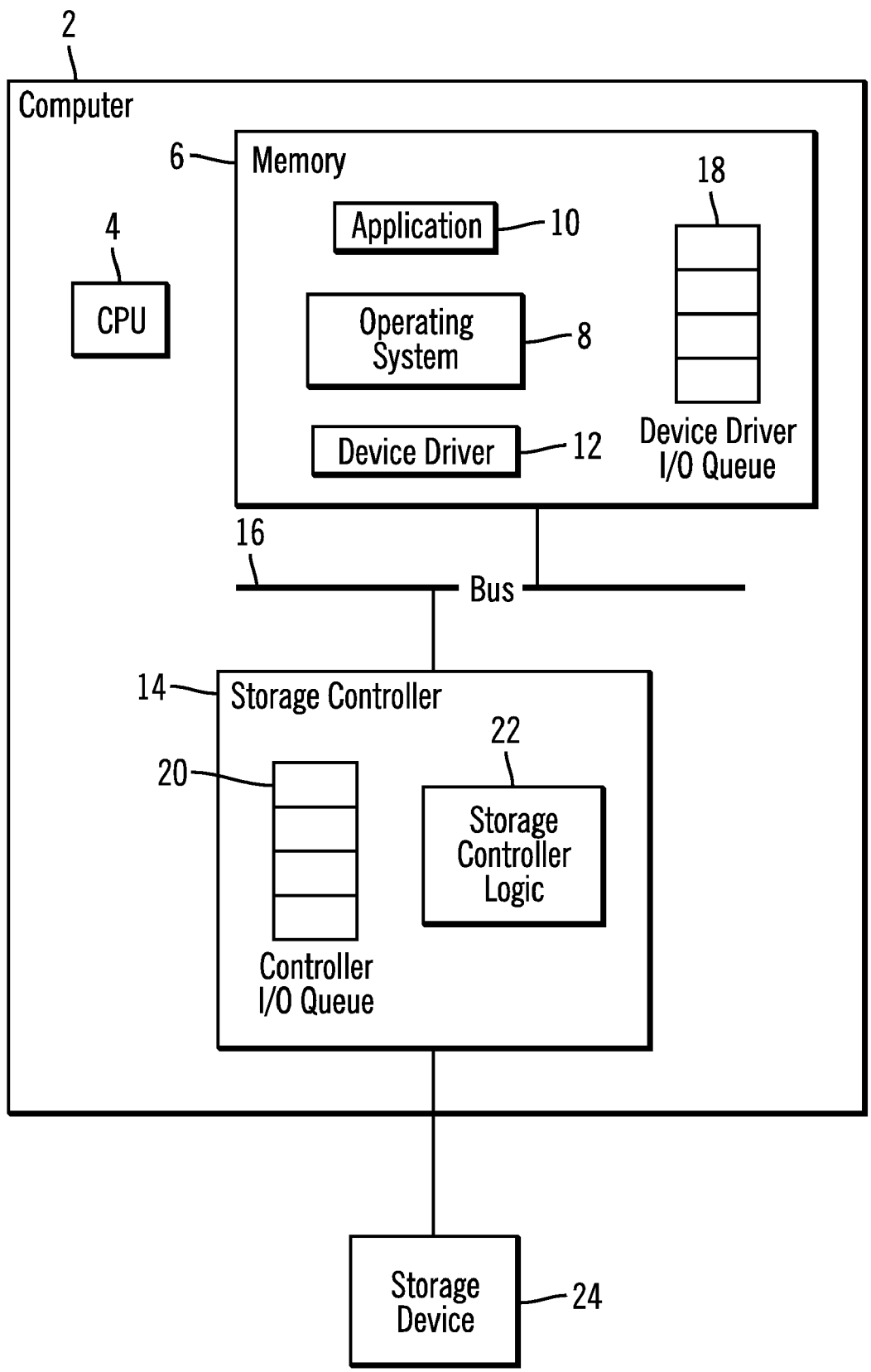
FIG. 1 illustrates a computing environment in which aspects of the invention are implemented.

FIG. 1 illustrates a computing environment in which aspects of the invention may be implemented. A computer 2 includes one or more central processing units (CPU) 4 (only one is shown), a volatile memory 6, an operating system 8. An application program 10 further executes in memory 6 and is capable of generating and receiving I/O requests. The computer 2 may comprise any computing device known in the art, such as a mainframe, server, personal computer, workstation, laptop, handheld computer, telephony device, network appliance, virtualization device, storage controller, etc. Any CPU 4 and operating system 8 known in the art may be used. Programs and data in memory 6 may be swapped into a local storage as part of memory management operations.

The computer 2 includes a device driver program 12 that provides an interface between the operating system 8 and a storage controller 14, wherein the device driver 12 communicates with the storage controller 14 via a bus interface 16. The storage controller 14 may implement any storage protocol known in the art, such as SCSI, RAID, IDE, ATA, SATA, etc. The bus 16 may implement any bus interface protocol known in the art, such as Peripheral Component Interconnect (PCI), etc. In FIG. 1, the storage controller 14 resides within the computer 2 enclosure, such as implemented in a peripheral card inserted in a card slot in the computer or as an integrated circuit on the computer 2 motherboard. Alternatively, the storage controller 14 may be implemented in a device external to the computer 2 enclosure that is coupled to the computer 2 via an interface port and cable or network connection, such as the case with an external I/O device, e.g., disk drive, tape drive, RAID array, printer, etc. Further, the storage controller 14 may be integrated with the storage device 24 in a single enclosure.

The device driver 12 maintains a device driver queue 18 in the memory 6 to queue I/O requests received from the application 10 and operating system 8. The device driver 12 would then forward the I/O requests to the controller I/O queue 20 implemented in the storage controller 14. In certain implementations, the queues 18 and 20 maintain I/O requests ordered according to their logical block addresses (LBAs), so that sequential I/O requests are adjacent in the queues 18 and 20. The storage controller 14 includes storage controller logic 22 to perform the storage controller related operations. The storage controller logic 22 may comprise a hardware component, such as an Application Specific Integrated Circuit (ASIC), or be implemented as a processor executing code.

The storage controller 14 transfers I/O requests from the controller I/O queue 20 to the storage device 24, which may comprise any storage device known in the art, such as a magnetic disk drive, a Just a Bunch of Disks (JBOD), RAID array, magnetic tape cartridge, optical disk, CD-ROM, Digital Versatile Disc (DVD), etc.

Figure 2:
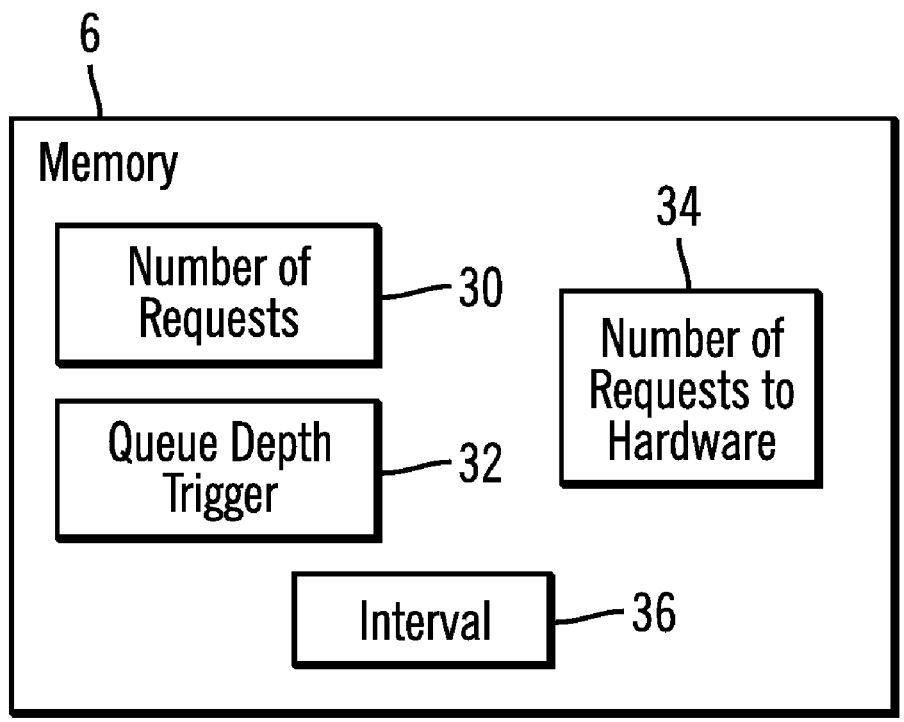
FIG. 2 illustrates information maintained to manage I/O requests in accordance with embodiments of the invention.

To manage I/O requests, the device driver 12 maintains the following information in memory 6, as shown in FIG. 2:

Number of Requests 30: this value is incremented whenever an I/O request is added to the device driver I/O queue 18 and decremented whenever a request is transmitted from the controller I/O queue 20 to the storage device 24, thus indicating the number of I/O requests queued in both the controller I/O queue 20 and the device driver I/O queue 18.

Queue Depth Trigger 32: indicates the number of I/O requests that must be in the controller I/O queue before the device driver 12 will begin coalescing I/O requests in the device driver I/O queue 18. In certain implementations, the queue depth trigger is set at or to the maximum number of requests that may be queued in the controller I/O queue 20.

Number of Requests to Hardware 34: indicates the number of I/O requests the device driver 12 has transmitted to the controller I/O queue 20 that remain in the queue 20. This value is incremented when a request has been added to the controller 10 queue 20 and decremented when the storage device 24 and storage controller 14 have returned complete to an I/O request back to the device driver 12.

Interval 36: a value used to determine the coalesce limit or maximum number of requests to coalesce. In certain embodiments, the larger the interval, the smaller the coalesce limit for a given device driver queue depth because, in certain embodiments, the coalesce limit equals the modulo of the (device driver queue depth 18 divided by the interval 36) plus one, i.e., the integer portion of the result of dividing the depth of the device driver queue 18 by the interval 36, and then add one.

Figure 3:
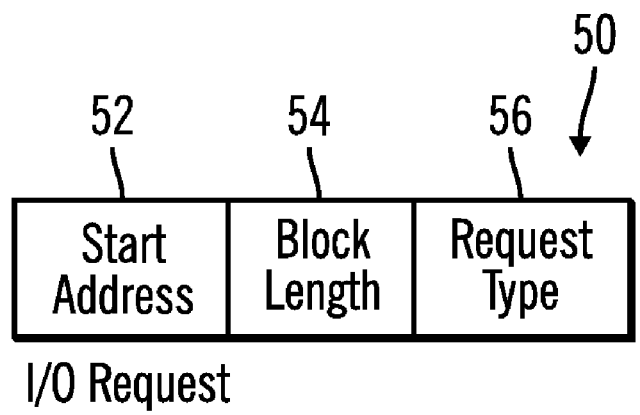
FIG. 3 illustrates information included in an I/O request in a manner known in the prior art.

FIG. 3 illustrates information that may be included in an I/O request 50, including a start block address 52, a block length 54, and a request type 56 indicating whether the request is for a read or write. Additional information may also be included with the request.

Figure 4A:
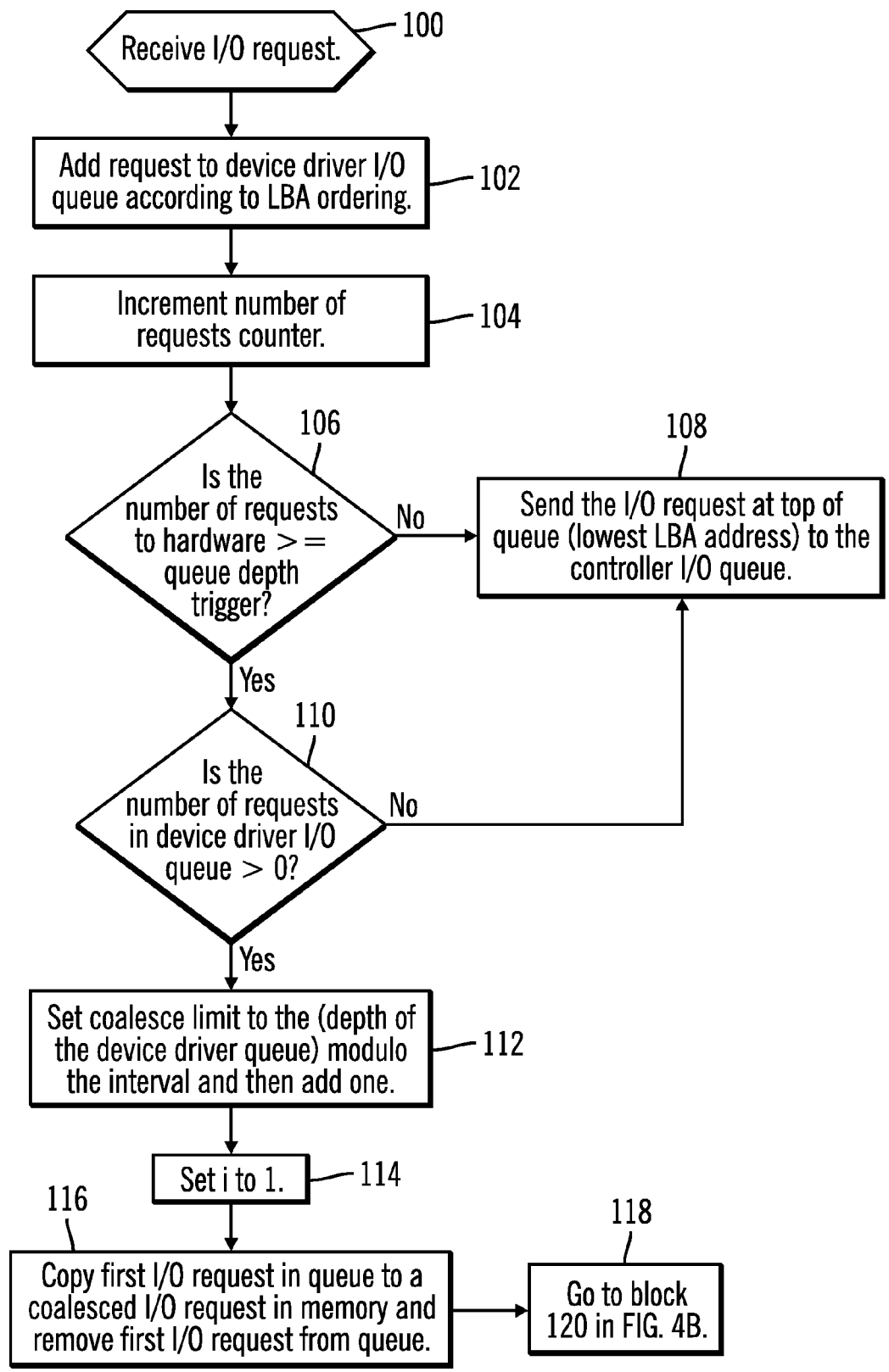
FIGS. 4a and 4b illustrate operations performed to manage I/O requests in accordance with embodiments of the invention.
Figure 4B:
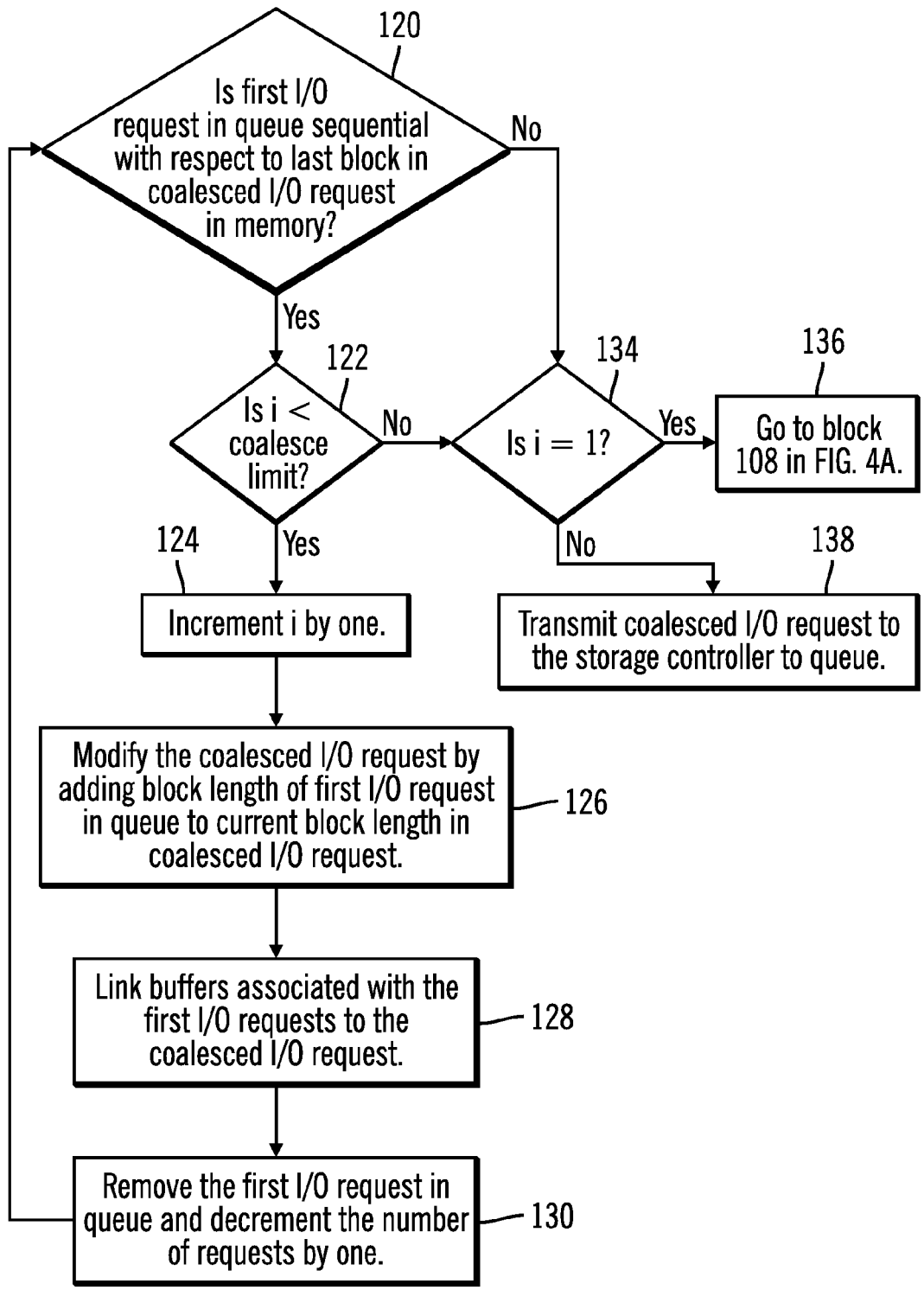

FIGS. 4a and 4b illustrate operations performed by the device driver 12 to coalesce I/O requests in accordance with described embodiments of the invention. With respect to FIG. 4a, upon receiving (at block 100) an I/O request, the I/O request is added (at block 102) to the device driver I/O queue 18 according to the order of the starting and ending LBA address in the request. This may be accomplished by scanning the I/O queue to locate the I/O request whose last requested block, which is the start address 52 plus the block length 54, is the closest preceding block to the start block address 52 of the received I/O request. The number of requests 30 counter is incremented (at block 104) by one. If (at block 106) the number of requests to hardware 34 is less than the queue depth trigger 32, then there is not a sufficient number of I/O requests queued at the storage controller 14 and control proceeds to send (at block 108) the I/O request at the top of the device driver I/O queue 18 (lowest LBA address) to the controller I/O queue 20 over the bus 16. If there are a sufficient number of requests queued at the storage controller (from the yes branch of block 106) and if (at block 110) there are no I/O requests queued in the device driver I/O queue 18, then control proceeds to block 108 to send only the I/O request at the top of the queue, having the lowest starting address 52 (FIG. 3).

If (from the yes branch of block 110) there is at least one I/O request in the device driver queue 18, as well as the threshold number in the controller I/O queue 20, then the device driver 12 sets (at block 112) a coalesce limit to the depth of the device driver queue modulo the interval plus one, i.e., the integer portion of the result of dividing the depth of the device driver queue 18 by the interval 36 plus one. The variable i is then set (at block 114) to one. The device driver 18 further copies (at block 116) the first I/O request at the top of the queue, which in First-In-First-Out (FIFO) queues would be the entry in the queue the longest, to a coalesced I/O request being built in memory 6 and removes this copied request from the queue. Control then proceeds (at block 118) to block 120 in FIG. 4b. At block 120, the device driver 12 determines whether the first I/O request in the queue 18 is to a storage location (logical or physical) that is sequential with respect to the last block in the coalesced I/O request being built in memory 6. The last block in the coalesced I/O request may be determined by adding the block length 54 to the start address 52 (FIG. 3). If the first I/O request is sequential and if (at block 122) i is less than the coalesce limit, which is the maximum number of I/O requests to coalesce with the request initially at the top of the I/O queue 18, then the device driver 12 increments (at block 124) i by one and modifies (at block 126) the coalesced I/O request by adding the block length of the first I/O request to the current block length in the coalesced I/O request. Since each I/O request is associated with a buffer in the memory 6, the device driver 12 may link (at block 128) the buffer location in memory 6 associated with the first I/O request to the coalesced I/O request, so that all the buffers associated with the requests to coalesce are linked to the coalesced I/O request. The first I/O request added to the coalesced I/O request is then removed (at block 130) from the device driver I/O queue 18 and the number of requests 30 is decremented by one. Control then proceeds back to block 120 to determine whether there are further I/O requests to coalesce.

If (at block 122) i is not less than the coalesce limit, meaning that there are no more requests to coalesce, and if (at block 134) i is equal to one, which means only one I/O request is to be coalesced or no coalescing, then control proceeds (at block 136) back to block 108 in FIG. 4a to send the I/O request at the top of the device driver queue 18. In such case, the coalesced I/O request could be discarded. Otherwise, if (at block 134) multiple requests are intended to be coalesced, i.e., i is greater than one, then the device driver 12 transmits (at block 138) the coalesced I/O request to the storage controller 14 to queue in the controller I/O queue 20.

Further, the number of requests 30 is decremented when an I/O request is removed from the device driver I/O queue 18. The storage controller logic 22 may notify the device driver 12 by returning complete to the I/O request when processing and removing an I/O request from the controller I/O queue 20, which may occur when the request has completed at the storage device 24.

FIG. 5 illustrates the relationship between the number of requests 30, the interval 36, the queue depth trigger 32 and the resulting coalesce limit determined according to the logic of FIGS. 4a and 4b when the queue depth trigger 32 is set to 127 and the interval 36 is set to 64. As shown in FIG. 5, if the number of requests 30 is less than the queue depth trigger 32, then no I/O requests are coalesced. However, as the number of requests 30 exceeds the queue depth trigger 32 and requests are in both I/O queues 18 and 20, then the coalesce limit increases as the number of I/O requests in the device driver 12 queue 18 increases by each interval amount. FIG. 5 illustrates how the logic of FIGS. 4a, 4b dynamically increases the coalesce limit as the number of I/O requests pending in the device driver I/O queue 18 increases to coalesce more requests to decrease the number of pending requests in the I/O queue 18. Further, with the logic of FIGS. 4a, 4b, as the number of requests in the device driver I/O queue 18 decreases, then the coalesce limit would dynamically decrease to coalesce fewer sequential I/O requests.

Thus, with the described embodiments, the number of sequential I/O requests coalesced for transmittal from the software (device driver) queue to the hardware (storage controller) queue can be dynamically adjusted based on the number of requests in the I/O queues to optimize I/O usage and bandwidth. Coalescing operations consume CPU resources. Thus, the described embodiments balance conservation of CPU resources and efficient queue management by dynamically reducing coalescing operations when coalescing is less needed, i.e., when there are relatively fewer I/O requests in the queues, and then increase coalescing as the number of queued I/O requests increase.

Additional Embodiment Details

The described techniques for processing I/O requests may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were described as being performed by the device driver 12 and storage controller logic 22. In alternative embodiments, operations described as performed by the device driver 12 may be performed by the storage controller logic 22, and vice versa In certain embodiments, there may be separate I/O queues in the device driver and storage controller for read and write I/O requests, and the logic of FIGS. 4a and 4b may be applied to such read and write queues separately.

In described implementations, the logic of FIGS. 4a and 4b to determine I/O requests to coalesce is implemented in the device driver 12 executing in the computer 2. In alternative implementations, the logic to coalesce I/O requests may be performed in the storage controller 14 to coalesce I/O requests to execute.

In the described implementations, the coalesce operations were performed in a storage controller managing I/O requests to a storage device. In additional implementations, the coalesce logic described herein may be used in device drivers queuing I/O requests directed to I/O devices other than storage controllers, such as a network adaptor, printer, etc.

In described embodiments, sequential I/O requests were coalesced. In alternative embodiments, non-sequential I/O requests may be coalesced into a single I/O request for transmittal.

In certain implementations, the device driver and described embodiments may be used with a storage controller managing I/O access to a magnetic storage medium, such as one or more magnetic disk drives, tape, etc., or non-magnetic media, such as an optical disc.

FIG. 2 illustrates information and variables used to perform the coalesce adjustment operations described in FIGS. 4a and 4b. In alternative implementation, additional or different information may be used to dynamically adjust the coalesce limit.

The illustrated logic of FIGS. 4a and 4b show certain events occurring in a certain order. In alternative embodiments, certain operations may be performed in a different order, modified or removed. Morever, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing requests to an Input/Output (I/O) device, comprising:
    queuing I/O requests directed to the I/O device in a first queue or a second queue;
    determining whether a number of queued I/O requests in the second queue exceeds a threshold;
    calculating a coalesce limit in response to determining that the number of queued I/O requests exceeds the threshold;
    coalescing a number of queued I/O requests from the first queue not exceeding the calculated coalesce limit into a coalesced I/O request; and
    transmitting the coalesced I/O request.

2. The method of claim 1, wherein the calculated coalesce limit dynamically varies based in part on the number of queued I/O requests.

3. The method of claim 2, wherein calculating the coalesce limit includes dividing the number of queued I/O requests by an interval.

4. The method of claim 1, wherein coalescing the queued I/O requests comprises:
    determining a maximum number of queued I/O requests up to the coalesce limit that are directed to data stored at sequential locations, wherein the determined I/O requests are coalesced into the coalesced I/O request, and wherein all the coalesced I/O requests are directed to data stored at sequential locations.

5. The method of claim 1, further comprising: adding the transmitted coalesced I/O request to the second queue.

6. The method of claim 1, wherein the first queue is maintained by a device driver in a computer memory and the second queue is implemented in a controller of the I/O device.

7. The method of claim 6, wherein the controller comprises a storage controller and the I/O device comprises a storage device.

8. The method of claim 1, further comprising:
determining whether there are at least two I/O requests in the first queue after determining that the number of requests in the second queue exceeds the first queue, wherein I/O requests from the first queue are only coalesced if there are at least two I/O requests in the first queue.

9. The method of claim 1, further comprising:
transmitting one I/O request from the first queue if the number of queued I/O requests in the second queue does not exceed the threshold.

10. A system for managing requests to a storage device, wherein a storage controller manages access to the storage device, comprising:
a processor;
a memory device accessible to the processor and including a first queue and wherein the storage controller includes a second queue; and
a device driver executed by the processor, wherein the device driver when executed causes operations to be performed, the operations comprising:
(i) queue I/O requests directed to the storage device in the first queue in the memory device;
(ii) determine whether a number of queued I/O requests in the second queue exceeds a threshold;
(iii) calculating a coalesce limit in response to determining that the number of queued I/O requests exceeds the threshold;
(iv) coalescing a number of queued I/O requests from the first queue not exceeding the calculated coalesce limit into a coalesced I/O request; and
(v) transmitting the coalesced I/O request.

11. The system of claim 10, wherein the calculated coalesce limit dynamically varies based in part on the number of queued I/O requests.

12. The system of claim 11, wherein calculating the coalesce limit includes dividing the number of queued I/O requests by an interval.

13. The system of claim 10, wherein coalescing the queued I/O requests comprises:
determining a maximum number of queued I/O requests up to the coalesce limit that are directed to data stored at sequential locations, wherein the determined I/O requests are coalesced into the coalesced I/O request, and wherein all the coalesced I/O requests are directed to data stored at sequential locations.

14. The system of claim 10, wherein the operations performed when executing the device driver further comprise:
determine whether there are at least two I/O requests in the first queue after determining that the number of requests in the second queue exceeds the first queue, wherein I/O requests from the first queue are only coalesced if there are at least two I/O requests in the first queue.

15. The system of claim 10, wherein the operations performed when executing the device driver further comprise:
transmit one I/O request from the first queue if the number of queued I/O requests in the second queue does not exceed the threshold.

16. An article of manufacture comprising a device implementing code for managing requests to an Input/Output (I/O) device, wherein the code causes operations to be performed, the operations comprising:
queuing I/O requests directed to the I/O device in a first queue or a second queue;
determining whether a number of queued I/O requests in the second queue exceeds a threshold;
calculating a coalesce limit in response to determining that the number of queued I/O requests exceeds the threshold;
coalescing a number of queued I/O requests from the first queue not exceeding the calculated coalesce limit into a coalesced I/O request; and
transmitting the coalesced I/O request.

17. The article of manufacture of claim 16, wherein the calculated coalesce limit dynamically varies based in part on the number of queued I/O requests.

18. The article of manufacture of claim 17, wherein calculating the coalesce limit includes dividing the number of queued I/O requests by an interval.

19. The article of manufacture of claim 16, wherein coalescing the queued I/O requests comprises:
determining a maximum number of queued I/O requests up to the coalesce limit that are directed to data stored at sequential locations, wherein the determined I/O requests are coalesced into the coalesced I/O request, and wherein all the coalesced I/O requests are directed to data stored at sequential locations.

20. The article of manufacture of claim 16, wherein the operations further comprise:
adding the transmitted coalesced I/O request to the second queue.

21. The article of manufacture of claim 16, wherein the first queue is maintained by a device driver in a computer memory and the second queue is implemented in a controller of the I/O device.

22. The article of manufacture of claim 21, wherein the controller comprises a storage controller and the I/O device comprises a storage device.

23. The article of manufacture of claim 16, wherein the operations further comprise:
determining whether there are at least two I/O requests in the first queue after determining that the number of I/O requests in the second queue exceeds the first queue, wherein I/O requests from the first queue are only coalesced if there are at least two I/O requests in the first queue.

24. The article of manufacture of claim 16, wherein the operations further comprise:
transmitting one I/O request from the first queue if the number of queued I/O requests in the second queue does not exceed the threshold.

25. The article of manufacture of claim 16, wherein the device comprises a computer readable medium or a hardware component.

* * * * *